US010999555B1

(12) United States Patent
Mautino et al.

(10) Patent No.: US 10,999,555 B1
(45) Date of Patent: May 4, 2021

(54) MEETING ROOM CONTROL VIA MOBILE DEVICE

(71) Applicant: Fuze, Inc., Boston, MA (US)

(72) Inventors: Richard Mautino, Austin, TX (US); Aaron Evans, Ottawa (CA); Clement Wehrung, Paris (FR)

(73) Assignee: Fuze, Inc., Boston, MA (US)

(*) Notice: Subject to any disclaimer, the term of this patent is extended or adjusted under 35 U.S.C. 154(b) by 0 days.

(21) Appl. No.: 16/889,675

(22) Filed: Jun. 1, 2020

(51) Int. Cl.
*H04N 7/15* (2006.01)

(52) U.S. Cl.
CPC .................... *H04N 7/152* (2013.01)

(58) Field of Classification Search
CPC ........................................................ H04N 7/15
USPC ........................................... 348/14.01–14.16
See application file for complete search history.

(56) References Cited

U.S. PATENT DOCUMENTS

| 2006/0259923 | A1* | 11/2006 | Chiu | H04N 21/2541 |
| | | | | 725/24 |
| 2015/0109399 | A1* | 4/2015 | Kuscher | H04N 7/147 |
| | | | | 348/14.02 |
| 2015/0140979 | A1* | 5/2015 | Agsteiner | H04W 84/12 |
| | | | | 455/416 |
| 2017/0006162 | A1* | 1/2017 | Bargetzi | H04W 4/06 |
| 2017/0331904 | A1* | 11/2017 | Padhye | H04L 67/148 |
| 2017/0357360 | A1* | 12/2017 | Li | H04R 3/00 |
| 2020/0059629 | A1* | 2/2020 | McArdle | H04L 12/1822 |

* cited by examiner

*Primary Examiner* — Melur Ramakrishnaiah
(74) *Attorney, Agent, or Firm* — McDermott Will & Emery LLP

(57) ABSTRACT

Various aspects of the subject technology relate to systems, methods, and machine-readable media for meeting room control. The method includes receiving, through a mobile device of a user, a request to access a meeting, the meeting comprising one or more meetings. The method also includes receiving, from the mobile device of the user, a request to toggle a control mode for the meeting, the control mode comprising an interface for the meeting, the interface displayed through the mobile device. The method also includes receiving instructions regarding controlling functions of the meeting through the interface on the mobile device, the functions comprising at least one of muting all meeting participants, promoting a speaker, recording the meeting, sharing the meeting, or transferring the meeting. The method also includes applying the instructions to the functions of the meeting.

18 Claims, 6 Drawing Sheets

US 10,999,555 B1

MEETING ROOM CONTROL VIA MOBILE DEVICE

TECHNICAL FIELD

The present disclosure generally relates to videoconferencing and teleconferencing, and more particularly to meeting room control via a mobile device.

BACKGROUND

Conventionally, videoconferencing and teleconferencing technology require use of a fixed/dedicated room controller that allows only a single user to control aspects of the meeting. The fixed/dedicated room controller typically is bulky and not meant for multiple users to access. This becomes problematic when multiple users desire control of the meeting, but are limited in their ability to access the fixed/dedicated room controller.

BRIEF SUMMARY

The subject disclosure provides for systems and methods for remote control of meeting room systems via a mobile device. In an aspect, multiple meeting participants may each receive access to meeting room controls through their mobile devices. For example, each mobile device may be configured with a meeting application through which the users may join a meeting. The meeting application may include a remote control mode of operation that may be toggled by the users to control aspects of the meeting.

According to one embodiment of the present disclosure, a computer-implemented method for meeting room control is provided. The method includes receiving, through a mobile device of a user, a request to access a meeting, the meeting comprising one or more meetings. The method also includes receiving, from the mobile device of the user, a request to toggle a control mode for the meeting, the control mode comprising an interface for the meeting, the interface displayed through the mobile device. The method also includes receiving instructions regarding controlling functions of the meeting through the interface on the mobile device, the functions comprising at least one of muting all meeting participants, promoting a speaker, recording the meeting, sharing the meeting, or transferring the meeting. The method also includes applying the instructions to the functions of the meeting.

According to one embodiment of the present disclosure, a system is provided including a processor and a memory comprising instructions stored thereon, which when executed by the processor, causes the processor to perform a method for meeting room control. The method includes receiving, through a mobile device of a user, a request to access a meeting, the meeting comprising one or more meetings. The method also includes receiving, from the mobile device of the user, a request to toggle a control mode for the meeting, the control mode comprising an interface for the meeting, the interface displayed through the mobile device. The method also includes receiving instructions regarding controlling functions of the meeting through the interface on the mobile device, the functions comprising at least one of muting all meeting participants, promoting a speaker, recording the meeting, sharing the meeting, or transferring the meeting. The method also includes applying the instructions to the functions of the meeting.

According to one embodiment of the present disclosure, a non-transitory computer-readable storage medium is provided including instructions (e.g., stored sequences of instructions) that, when executed by a processor, cause the processor to perform operations for meeting room control. The operations include receiving, through a mobile device of a user, a request to access a meeting, the meeting comprising one or more meetings. The operations also include receiving, from the mobile device of the user, a request to toggle a control mode for the meeting, the control mode comprising an interface for the meeting, the interface displayed through the mobile device. The operations also include receiving instructions regarding controlling functions of the meeting through the interface on the mobile device, the functions comprising at least one of muting all meeting participants, promoting a speaker, recording the meeting, sharing the meeting, or transferring the meeting. The operations also include applying the instructions to the functions of the meeting.

According to one embodiment of the present disclosure, a system is provided that includes means for storing instructions, and means for executing the stored instructions that, when executed by the means, cause the means to perform a method for meeting room control. The method includes receiving, through a mobile device of a user, a request to access a meeting, the meeting comprising one or more meetings. The method also includes receiving, from the mobile device of the user, a request to toggle a control mode for the meeting, the control mode comprising an interface for the meeting, the interface displayed through the mobile device. The method also includes receiving instructions regarding controlling functions of the meeting through the interface on the mobile device, the functions comprising at least one of muting all meeting participants, promoting a speaker, recording the meeting, sharing the meeting, or transferring the meeting. The method also includes applying the instructions to the functions of the meeting.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Conventionally, videoconferencing and teleconferencing technology requires use of a fixed/dedicated room controller that allows only a single user to control aspects of the meeting. The fixed/dedicated room controller typically is bulky and not meant for multiple users to access. This becomes problematic when multiple users desire control of the meeting, but are limited in their ability to access the fixed/dedicated room controller. As a result, it becomes a complicated process to control simple aspects of the meeting (e.g., muting all participants, sharing a screen, etc.) by multiple users.

Aspects of the present disclosure address these issues by providing for meeting room control via a mobile device. In an aspect, multiple meeting participants may each receive access to meeting room controls through their mobile devices. For example, each mobile device may be configured with a meeting application through which the users may join a meeting. The meeting application may include a remote control mode of operation that may be toggled by the users to control aspects of the meeting. As a result, multiple hosts may control common meeting functions without having to change chairs, designate someone as a controller, or pass a device around a meeting room, etc. Additionally, the mobile device itself is portable and more convenient to use, instead of a fixed/dedicated room controller (e.g., a full-sized computer, hardphone, etc.).

The disclosed system addresses a problem in traditional videoconferencing and teleconferencing tied to computer technology, namely, the technical problem of controlling functions of a meeting. The disclosed system solves this technical problem by providing a solution also rooted in computer technology, namely, by providing for meeting control via a mobile device. The disclosed system also improves the functioning of the computer itself because it improves efficiency of meeting controls.

Figure 1:
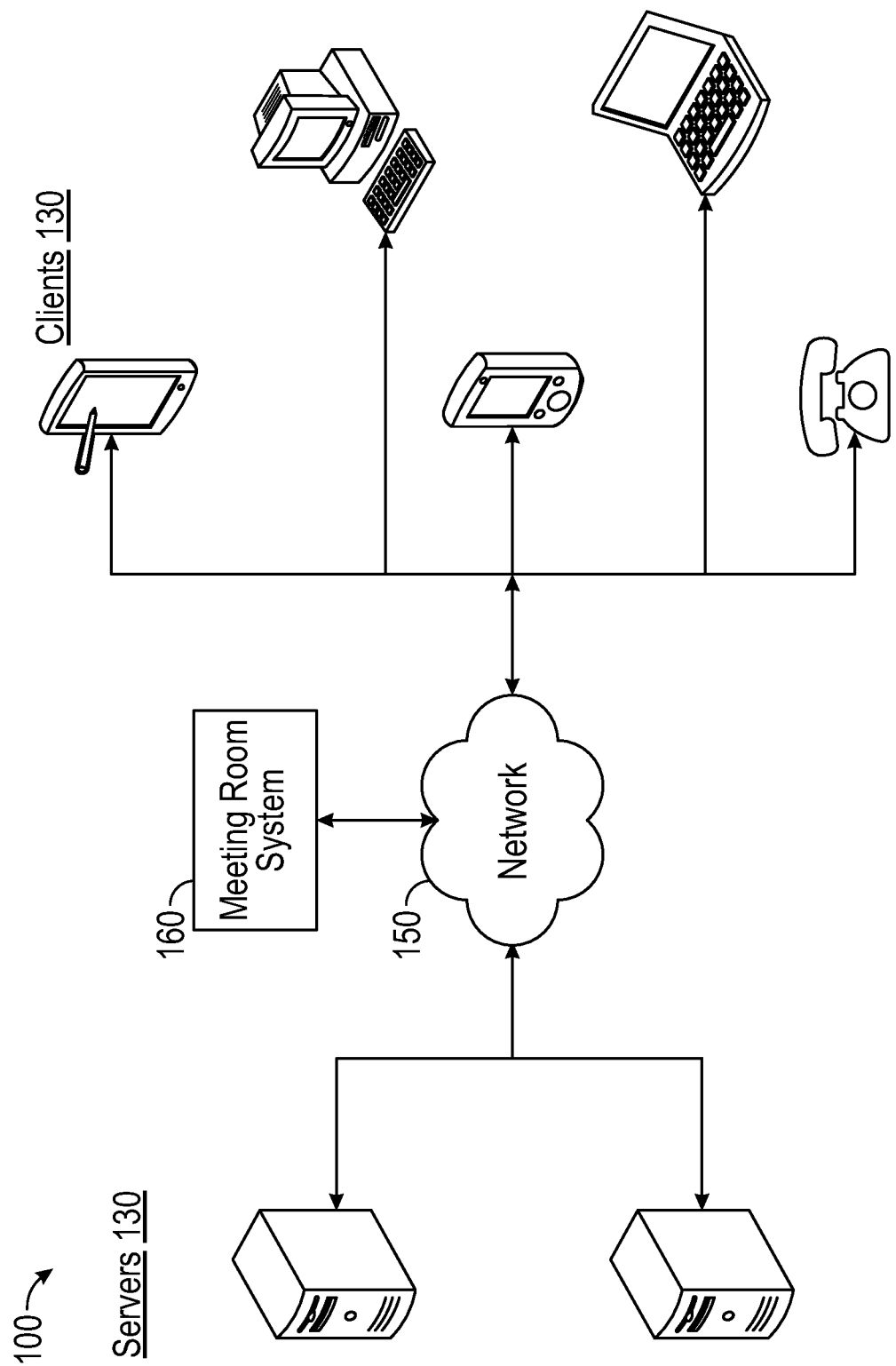
FIG. 1 illustrates an example unified communication platform, according to some embodiments.

FIG. 1 illustrates an example unified communication platform 100, according to some embodiments. The unified communication platform 100 includes servers 130, clients 110, and one or more meeting room systems 160 connected over a network 150. In some embodiments, the processor in server 130 is configured to host an application for operating a unified communication network between multiple client devices 110. Further, in some embodiments, the processor in server 130 is configured to provide support for collaborative network event applications, and other networking applications such as meeting services and the like, to a participant in the unified communication network through client device 110. The servers 130 can return images, documents, rich-text documents, and the like intended for shared use and modification by multiple participants in a meeting as disclosed herein. In some embodiments, servers 130 are configured to transmit voice over internet protocols (VoIP) data packets to and from one or more client devices 110. For purposes of load balancing, multiple servers 130 can host memories including instructions to one or more processors and multiple servers 130 for hosting one or more tools as disclosed herein.

The client devices 110 can be, for example, desktop computers, mobile computers, tablet computers (e.g., including e-book readers), mobile devices (e.g., a smartphone or PDA), or any other devices having appropriate processor, memory, and communications capabilities for accessing a meeting through one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like. The meeting room system 160 may include, for example, one or more cameras, microphones, speakers, displays, and hardware and/or software configured for executing collaboration software (e.g., meeting software).

Figure 2:
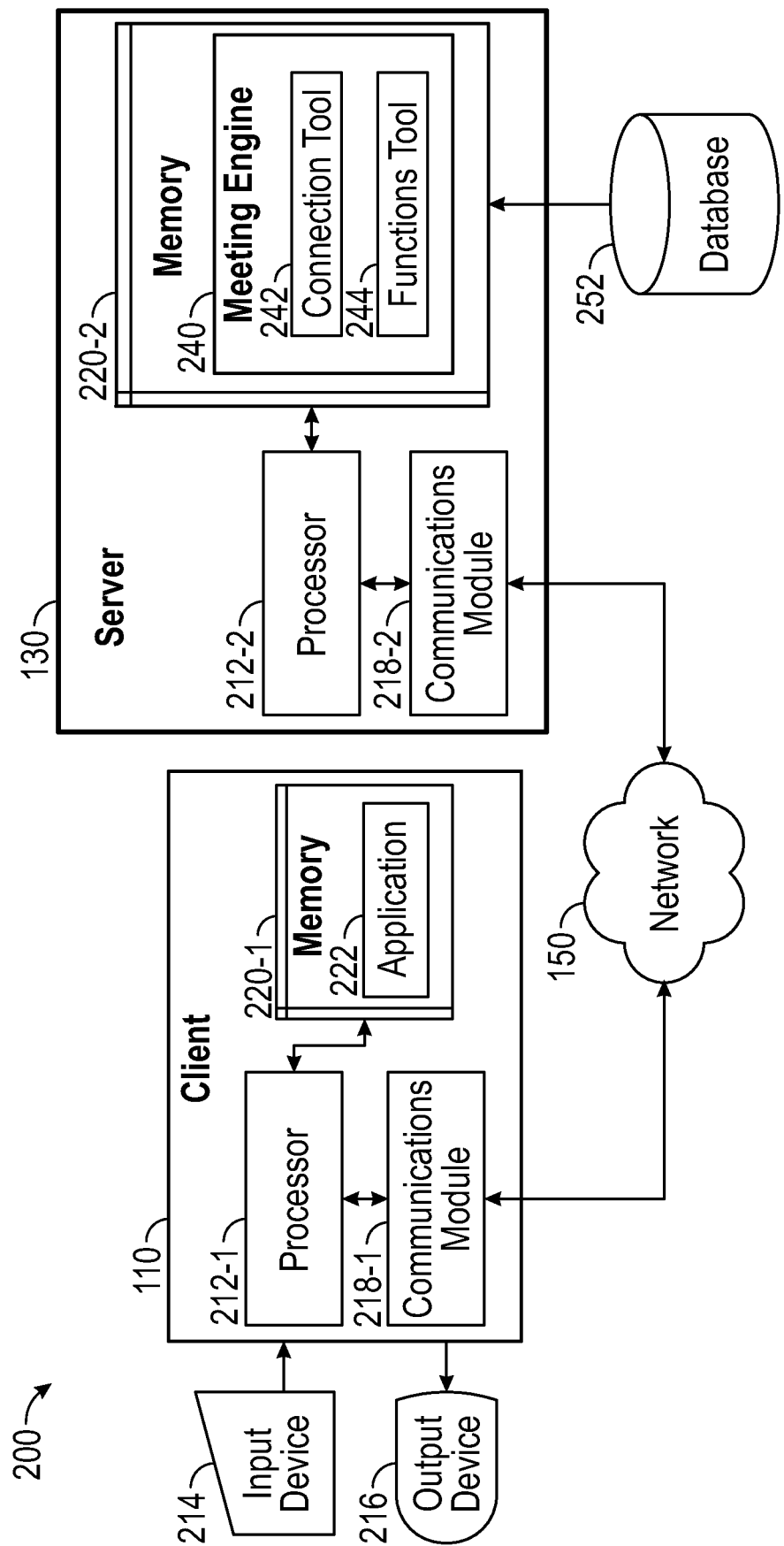
FIG. 2 is a block diagram illustrating an example server and client from the unified communication platform of FIG. 1, according to certain aspects of the disclosure.

FIG. 2 is a block diagram illustrating an example server and a client device in a unified communication platform 200, according to certain aspects of the disclosure. The client device 110 and the server 130 are communicatively coupled over the network 150 via respective communication modules 218-1 and 218-2 (hereinafter, collectively referred to as "communication modules 218"). The communication modules 218 are configured to interface with the network 150 to send and receive information, such as data, requests, responses, and commands to other devices on the network 150. The communications modules 218 can be, for example, modems or Ethernet cards. In some embodiments, the communication modules 218 may be configured to receive and transmit voice and video data over a telephone network, a wireless cellular network, a data network (e.g., VoIP), or any combination of the above. In some embodiments, the communication modules 218 may be configured to transmit data between one or more participants in a meeting.

The client device 110 may be any one of a desktop computer, a laptop, or a mobile computing device. The client device 110 may include a processor 212-1 and a memory 220-1. An input device 214 and an output device 216 enable the user to interact with the client device 110. Examples of the input device 214 and the output device 216 may include a mouse, a keyboard, a display, a touch-interactive display, and the like.

A processor 212-1 is configured to execute instructions, such as instructions physically coded into the processor 212-1, instructions received from software in memory 220-1, or a combination of both. A user of the client device 110 may use an input device 214 to control meeting functions through a meeting engine 240 via a user interface of an application 222.

Server 130 includes a memory 220-2, a processor 212-2, and a communications module 218-2. The user interface is displayed for the user in an output device 216 of the client device 110. The memory 220-2 includes a meeting engine 240 and a database 252. In some embodiments, an application 222 in the client device 110 may communicate with meeting engine 240 using a connection tool 242 and a functions tool 244. In some embodiments, establishing a communication channel between one or more client devices 110 may include determining that one or more of the client devices 110 is a subscriber of a client network of the server 130. For example, in some embodiments, the client device 110 having an application 222 installed in the memory 220-1 is a subscriber of a client network of the server 130. For example, in some embodiments, participants in a meeting may all be members of an enterprise or organization registered with the server 130, or is a client of the services provided by the server 130. In some embodiments, at least one of the client devices 110 participating in a communication channel hosted by the server 130 may not be a subscriber of a client network of the server 130. For example, in some embodiments, at least one of the client devices 110 participating in a communication channel may be a subscriber of a public network, and available through a telephone number.

The user may access meeting engine 240 through the application 222 installed in the memory 220-1 of client device 110. The user may also access the meeting engine 240 via a web browser installed in the client device 110, or simply by dialing a telephone number (e.g., a telephone number in database 252, or any other number registered within unified communication platform 200). Execution of the application 222 may be controlled by the processor 212-1. In some embodiments, the application 222 is downloaded and installed by the user into the client device 110, from the server 130.

Figure 3:
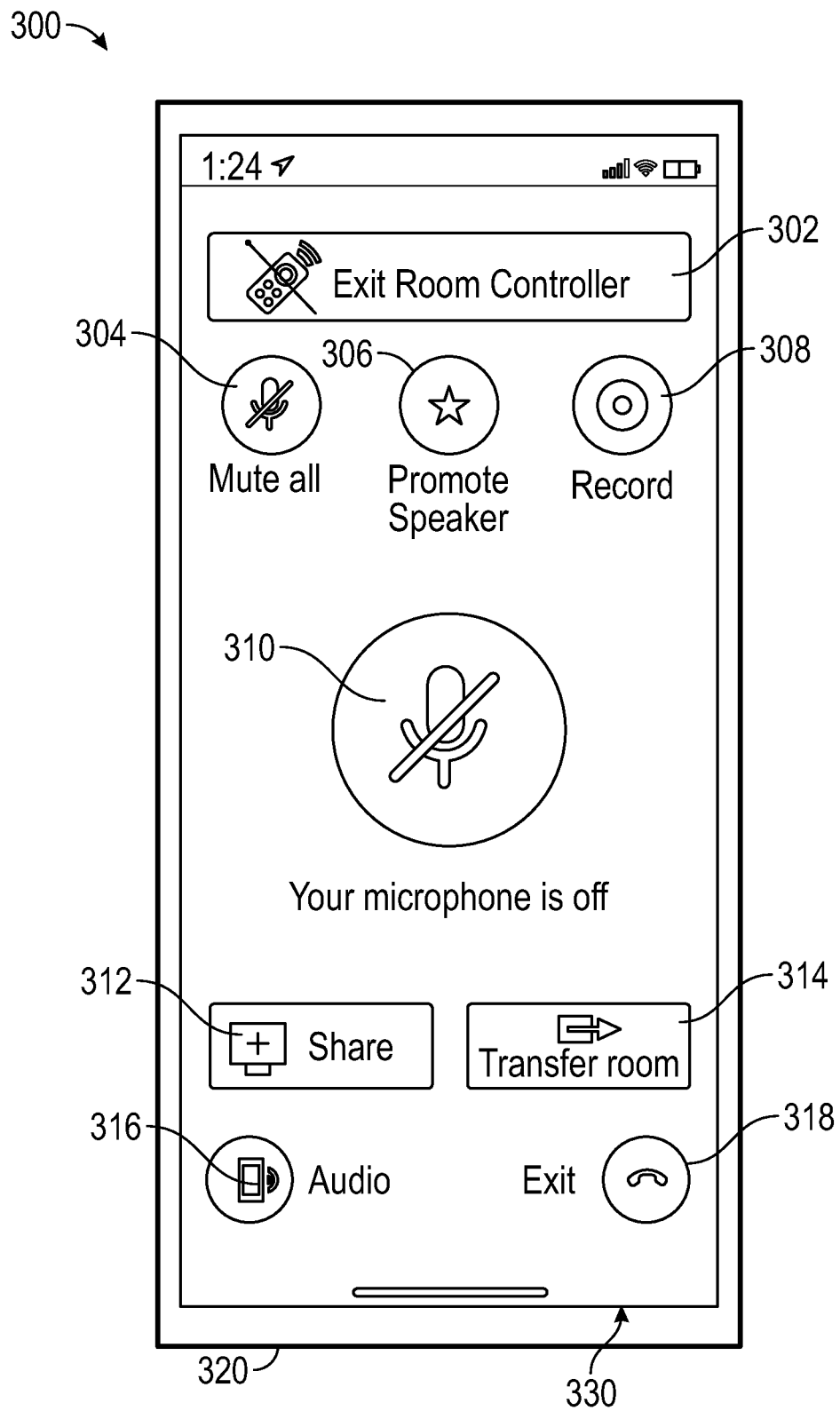
FIG. 3 illustrates an exemplary user interface for controlling a meeting through a mobile device, according to certain aspects of the present disclosure.

FIG. 3 illustrates an exemplary user interface 300 (e.g., an interface) for controlling a meeting through a mobile device 320, according to certain aspects of the present disclosure. For example, the meeting may include one or more meetings that are being held in one or more meeting rooms, both virtual and non-virtual. According to aspects, meeting rooms may be outfitted with a meeting room system (e.g., video/audio capture devices, speakers, one or more monitors/video display devices, and hardware/software running a meeting/collaboration software client). It is further understood that a "meeting room" may include any suitable locale outfitted with a meeting room system to allow one or more participants to participate in an audio/video/collaboration session.

The user interface 300 may include a room controller function 302 that toggles a remote mode (e.g., a control mode) for the meeting through the mobile device 320. As illustrated, the room controller function 302 has already been activated, and toggling the controller function 302 again would revert the interface 300 back to a normal mode. For example, the normal mode may include additional functionality for the meeting that is not included in the remote mode. That is because the remote mode includes a simplified interface for users to navigate that includes the most commonly used meeting functions.

According to aspects, the user interface 300 may include functionality for controlling various aspects of the meeting through the mobile device 320 of the user. For example, controls may be included for muting all participants 304, promoting a speaker 306, recording the meeting 308, muting/unmuting 310 a user microphone on the mobile device 320, sharing a screen 312, transferring a meeting room 314, audio connectivity 316, and ending the meeting 318. Additional controls may be included for kicking a remote participant, screen share controls, and controlling cameras of room systems (e.g., angle, pitch, and zoom), among others. It is understood that these described functions are exemplary only, and other functions, including any commonly used meeting functions, may be added and/or substituted for any of the displayed functions without departing from the scope of the disclosure.

According to aspects, muting all participants 304 mutes all participants of the meeting so that only a single speaker may be heard. Promoting a speaker 306 may allow a single speaker to be highlighted, zoomed-in on, projected onto a main screen, etc., so that the speaker may be appropriately heard.

In an implementation, promoting the speaker 306 may be only allowed by users with host privileges. For example, any host of the meeting may provide host privileges to other users. According to an aspect, a speaker may also be demoted through similar means. According to additional aspects, facial recognition of participants visible to a camera may be utilized to quickly identify a face of a speaker to focus the camera on that person for everyone to see. Furthermore, different angles of the speaker may be chosen to determine a best angle.

Recording the meeting 308 allows for recording of the meeting or parts of the meeting. Muting/unmuting 310 causes a user microphone on the mobile device 320 to be either muted or unmuted. Sharing a screen 312 allows the user to share their screen from their mobile device (e.g., display, cloud, application, etc.). Transferring a meeting room 314 allows the user to transfer the meeting to another room or another device. For example, nearby rooms may be automatically discovered through multiple channels including Bluetooth proximity or ultrasonic signaling from room speakers. In an implementation, a list of rooms may be obtained by integration with corporate directory/calendar systems. According to aspects, the meeting may be a virtual meeting with virtual participants.

Audio connectivity 316 allows audio from the meeting to be played over a wireless sound system (e.g., switching an audio source). Ending the meeting 318 allows the user to end/exit the meeting through their mobile device. For example, the user may be asked to confirm that they are ending/exiting the meeting before the end meeting 318 task is executed.

According to aspects, any user participating in the meeting may access the user interface 300 through their own mobile device. For example, the user interface 300 may be accessed through a meeting application 330 that may be installed on the user devices. The meeting application 330 may be configured to join the meeting through the mobile device. For example, the users may select a mode in which to join the meeting. According to aspects, users may join in a normal meeting mode, a silent mode (e.g., muting on join), or the remote mode. In an implementation, joining in the remote mode directly would allow users to access the interface 300 for the sole purpose of controlling the meeting through their mobile device.

According to aspects, any mobile device can manage the meeting virtual scene and/or stage. For example, a mobile remote (e.g., user interface 300) may be utilized to focus the video in a room on a specific person, set several key participants as focused and/or larger videos, have a laser pointer, etc. As a result, the mobile remote may include controls that go beyond and offer features not as easy to use from a conventional primary room control device.

As described herein, the user interface 300 leverages existing functions and controls in a format designed for portable controlling of a meeting room, similar to "car mode" where most buttons are removed and key buttons are made larger for safety. As a result, any user mobile device may become a room controller. According to aspects, a user may remotely control one or more meetings, each meeting having one or more meeting rooms with meeting participants. In this way, a single meeting administrator may oversee and control multiple meetings simultaneously through the user interface 300.

Figure 4:
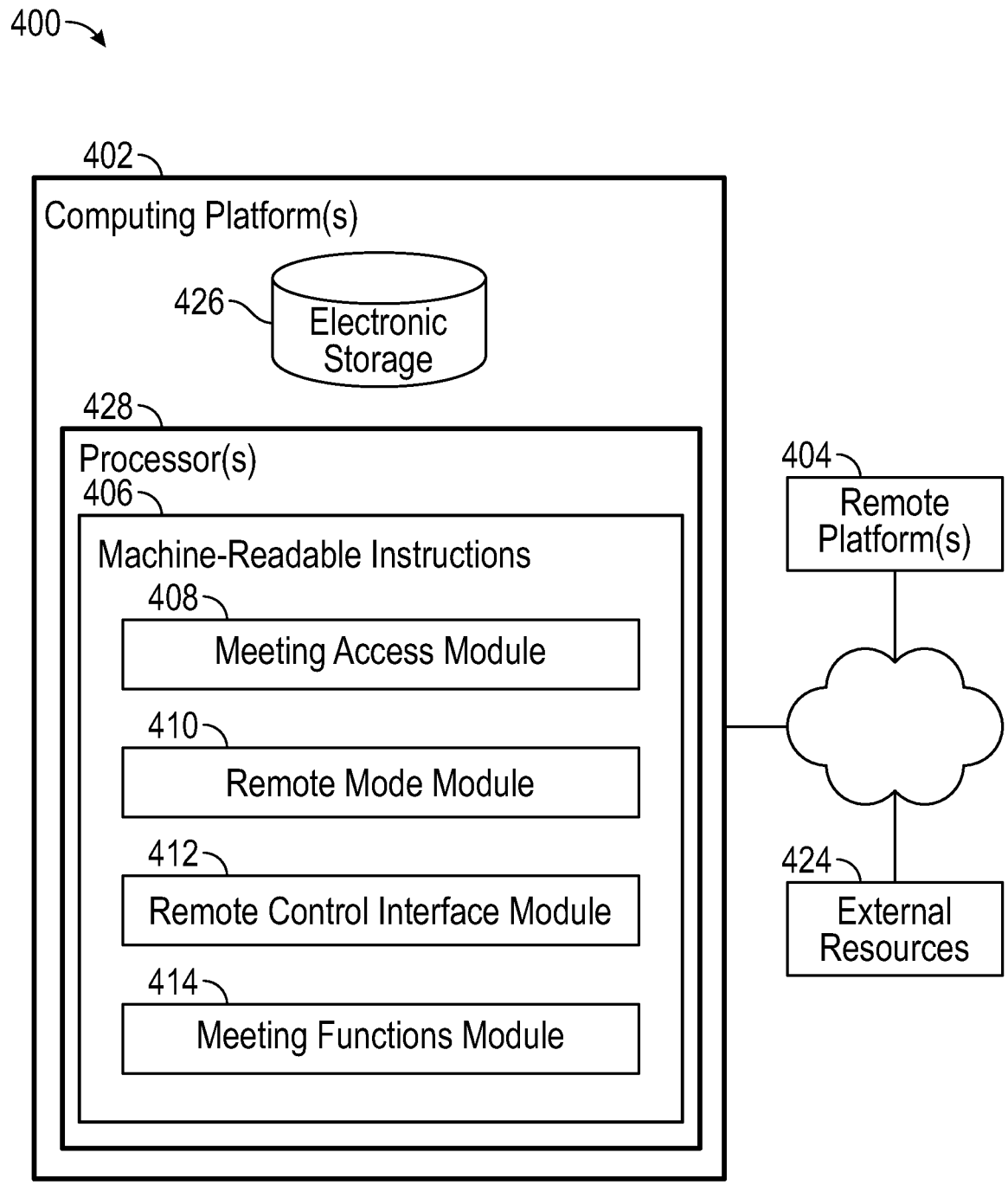
FIG. 4 illustrates an exemplary system for controlling a meeting through a mobile device, in accordance with one or more implementations.

FIG. 4 illustrates an exemplary system 400 for controlling a meeting through a mobile device, in accordance with one or more implementations. In some implementations, system 400 may include one or more computing platforms 402. Computing platform(s) 402 may be configured to communicate with one or more remote platforms 404 according to a client/server architecture, a peer-to-peer architecture, and/or other architectures. Remote platform(s) 404 may be configured to communicate with other remote platforms via computing platform(s) 402 and/or according to a client/server architecture, a peer-to-peer architecture, and/or other architectures. Users may access system 400 via remote platform(s) 404.

Computing platform(s) 402 may be configured by machine-readable instructions 406. Machine-readable instructions 406 may include one or more instruction modules. The instruction modules may include computer program modules. The instruction modules may include one or more of meeting access module 408, remote mode module 410, remote control interface module 412, meeting functions module 414, and/or other instruction modules.

Meeting access module 408 may be configured to access a meeting through a mobile device of a user. By way of non-limiting example, the meeting may include one or more meetings having one or more meeting rooms and meeting participants. The meeting may be a virtual meeting with virtual participants.

Remote mode module 410 may be configured to toggle a control mode for the meeting through the mobile device. By way of non-limiting example, the control mode may include an interface for the meeting.

Remote control interface module 412 may be configured to cause display of the control interface for the meeting through the mobile device.

Meeting functions module 414 may be configured to control functions of the meeting through the interface. By way of non-limiting example, the functions may include at least one of muting all the meeting participants, promoting a speaker, recording the meeting, sharing the meeting, or transferring the meeting to another room.

In some implementations, computing platform(s) 402, remote platform(s) 404, and/or external resources 424 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 402, remote platform(s) 404, and/or external resources 424 may be operatively linked via some other communication media.

A given remote platform 404 may include one or more processors configured to execute computer program modules. The computer program modules may be configured to enable an expert or user associated with the given remote platform 404 to interface with system 400 and/or external resources 424, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a NetBook, a Smartphone, a gaming console, and/or other computing platforms.

External resources 424 may include sources of information outside of system 400, external entities participating with system 400, and/or other resources. In some implementations, some or all of the functionality attributed herein to external resources 424 may be provided by resources included in system 400.

Computing platform(s) 402 may include electronic storage 426, one or more processors 428, and/or other components. Computing platform(s) 402 may include communication lines or ports to enable the exchange of information with a network and/or other computing platforms. Illustration of computing platform(s) 402 in FIG. 4 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

Electronic storage 426 may comprise non-transitory storage media that electronically stores information. The electronic storage media of electronic storage 426 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from computing platform(s) 402, information received from remote platform(s) 404, and/or other information that enables computing platform(s) 402 to function as described herein.

Processor(s) 428 may be configured to provide information processing capabilities in computing platform(s) 402. As such, processor(s) 428 may include one or more of a digital processor, an analog processor, a digital circuit designed to process information, an analog circuit designed to process information, a state machine, and/or other mechanisms for electronically processing information. Although processor(s) 428 is shown in FIG. 4 as a single entity, this is for illustrative purposes only. In some implementations, processor(s) 428 may include a plurality of processing units. These processing units may be physically located within the same device, or processor(s) 428 may represent processing functionality of a plurality of devices operating in coordination. Processor(s) 428 may be configured to execute modules 408, 410, 412, and/or 414, and/or other modules. Processor(s) 428 may be configured to execute modules 408, 410, 412, and/or 414, and/or other modules by software; hardware; firmware; some combination of software, hardware, and/or firmware; and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, and/or 414 are illustrated in FIG. 4 as being implemented within a single processing unit, in implementations in which processor(s) 428 includes multiple processing units, one or more of modules 408, 410, 412, and/or 414 may be implemented remotely from the other modules. The description of the functionality provided by the different modules 408, 410, 412, and/or 414 described below is for illustrative purposes, and is not intended to be limiting, as any of modules 408, 410, 412, and/or 414 may provide more or less functionality than is described. For example, one or more of modules 408, 410, 412, and/or 414 may be eliminated, and some or all of its functionality may be provided by other ones of modules 408, 410, 412, and/or 414. As another example, processor(s) 428 may be configured to execute one or more additional modules that may perform some or all of the functionality attributed below to one of modules 408, 410, 412, and/or 414.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
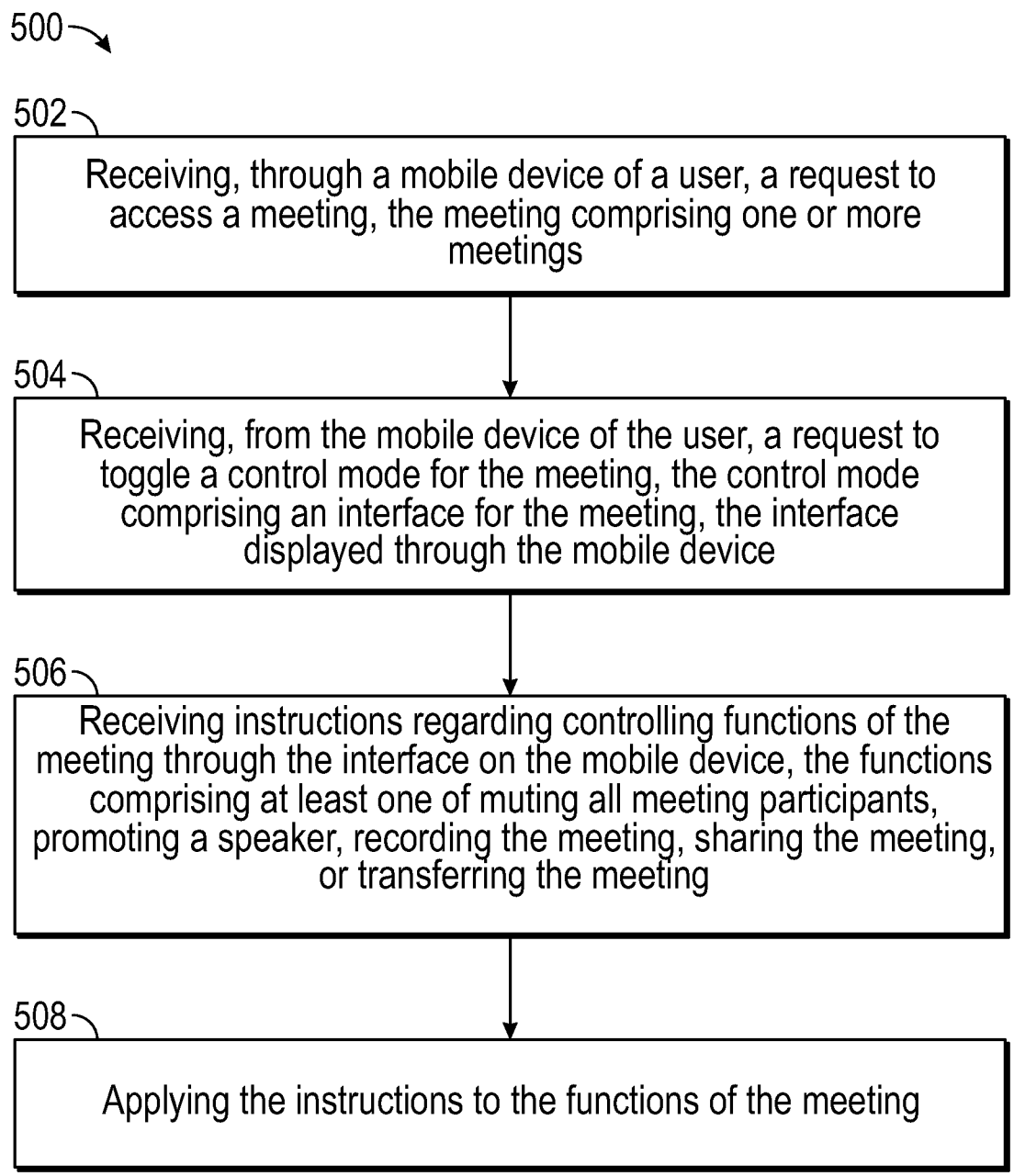
FIG. 5 illustrates an example flow diagram for controlling a meeting through a mobile device, according to certain aspects of the disclosure.

FIG. 5 illustrates an example flow diagram (e.g., process 500) for controlling a meeting through a mobile device, according to certain aspects of the disclosure. For explanatory purposes, the example process 500 is described herein with reference to FIGS. 1-4. Further for explanatory purposes, the steps of the example process 500 are described herein as occurring in serial, or linearly. However, multiple instances of the example process 500 may occur in parallel. For purposes of explanation of the subject technology, the process 500 will be discussed in reference to FIGS. 1-4.

At step 502, a request to access a meeting is received through a mobile device of a user, the meeting comprising one or more meetings having one or more meeting rooms and meeting participants. At step 504, a request to toggle a control mode for the meeting is received through the mobile device, the control mode comprising an interface for the meeting. For example, the interface is displayed through the mobile device. At step 506, instructions are received regarding controlling functions of the meeting through the interface on the mobile device. The functions include at least one of muting all meeting participants, promoting a speaker, recording the meeting, sharing the meeting, or transferring the meeting to another room. At step 508, the instructions are applied to the functions of the meeting.

For example, as described above in relation to FIGS. 1-4, at step 502, a request for accessing a meeting (e.g., via meeting engine 240) is received through a mobile device (e.g., client 110) of a user (e.g., through meeting access module 408), the meeting comprising one or more meetings having one or more meeting rooms and meeting participants. At step 504 a request from a user to toggle a control mode (e.g., through remote mode module 410) for the meeting is received through the mobile device (e.g., mobile device 320), the control mode comprising an interface (e.g., user interface 300) for the meeting. The interface may be displayed (e.g., through remote control interface module 412) for the meeting through the mobile device. At step 506, instructions regarding controlling functions of the meeting are received through the interface on the mobile device (e.g., through meeting functions module 414), the functions comprising at least one of muting all meeting participants, promoting a speaker, recording the meeting, sharing the meeting, or transferring the meeting (e.g., meeting room) to another room. At step 508, the instructions are applied (e.g., through meeting functions module 414) to the functions of the meeting.

According to an aspect, the control mode includes a reduced set of user controls. According to an aspect, the interface comprises large-sized icons for ease of user access. According to an aspect, toggling the control mode automatically mutes the user on the mobile device of the user.

According to an aspect, the process 500 may further include receiving a selection for the meeting through the mobile device, and granting the mobile device access to the meeting in the control mode.

According to an aspect, the process 500 may further include confirming that the user has host privileges for the meeting.

According to an aspect, the mobile device accesses the meeting through a meeting application installed on the mobile device of the user. According to an aspect, the meeting comprises a virtual meeting. According to an aspect, a meeting room of the meeting comprises a virtual meeting room.

Figure 6:
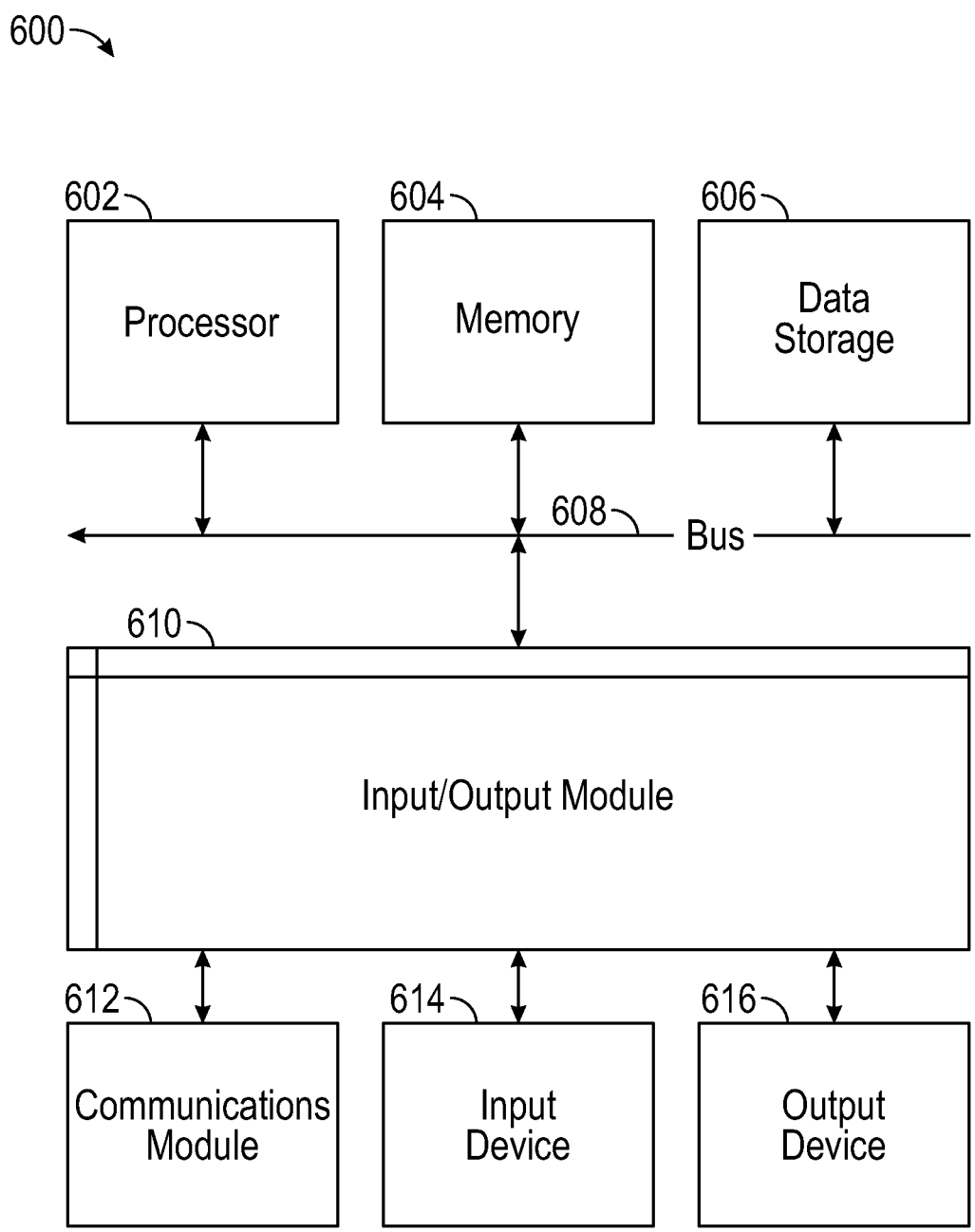
FIG. 6 is a block diagram illustrating an example computer system (e.g., representing both client and server) with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

Computer system 600 (e.g., server and/or client) includes a bus 608 or other communication mechanism for communicating information, and a processor 602 coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices, such as an LCD (liquid crystal display) monitor, for displaying information to the user.

According to one aspect of the present disclosure, the above-described gaming systems can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads game data and provides a game, information may be read from the game data and stored in a memory device, such as the memory 604. Additionally, data from the memory 604 servers accessed via a network, the bus 608, or the data storage 606 may be read and loaded into the memory 604. Although data is described as being found in the memory 604, it will be understood that data does not have to be stored in the memory 604 and may be stored in other memory accessible to the processor 602 or distributed among several media, such as the data storage 606.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for meeting room control, comprising:
    receiving, through a mobile device of a user, a request to access a meeting in at least one of a normal mode, a silent mode, or a control mode, the meeting comprising one or more virtual and/or non-virtual meetings;
    receiving, from the mobile device of the user, a request to toggle the control mode for the meeting, the control mode comprising an interface for the meeting, the interface displayed through the mobile device, wherein toggling the control mode automatically mutes the user on the mobile device of the user;
    receiving instructions regarding controlling functions of the meeting through the interface on the mobile device, the functions comprising at least one of muting all meeting participants, promoting a speaker, recording the meeting, sharing the meeting, or transferring the meeting; and
    applying the instructions to the functions of the meeting.

2. The computer-implemented method of claim 1, wherein the control mode comprises a reduced set of user controls.

3. The computer-implemented method of claim 1, wherein the interface comprises large-sized icons for ease of user access.

4. The computer-implemented method of claim 1, further comprising:
    receiving a selection for the meeting through the mobile device; and
    granting the mobile device access to the meeting in the control mode.

5. The computer-implemented method of claim 1, further comprising:
    confirming that the user has host privileges for the meeting.

6. The computer-implemented method of claim 1, wherein the mobile device accesses the meeting through a meeting application installed on the mobile device of the user.

7. The computer-implemented method of claim 1, wherein the meeting comprises a virtual meeting.

8. The computer-implemented method of claim 1, wherein a meeting room of the meeting comprises a virtual meeting room.

9. A system for meeting room control, comprising:
    a processor; and
    a memory comprising instructions stored thereon, which when executed by the processor, causes the processor to perform:
        receiving, through a mobile device of a user, a request to access a meeting in at least one of a normal mode, a silent mode, or a control mode, the meeting comprising one or more virtual and/or non-virtual meetings;

receiving, from the mobile device of the user, a request to toggle the control mode for the meeting, the control mode comprising an interface for the meeting, the interface displayed through the mobile device, wherein toggling the control mode automatically mutes the user on the mobile device of the user;

receiving instructions regarding controlling functions of the meeting through the interface on the mobile device, the functions comprising at least one of muting all meeting participants, promoting a speaker, recording the meeting, sharing the meeting, or transferring the meeting; and applying the instructions to the functions of the meeting.

10. The system of claim 9, wherein the control mode comprises a reduced set of user controls.

11. The system of claim 9, wherein the interface comprises large-sized icons for ease of user access.

12. The system of claim 9, further comprising stored sequences of instructions, which when executed by the processor, cause the processor to perform:

receiving a selection for the meeting through the mobile device; and granting the mobile device access to the meeting in the control mode.

13. The system of claim 9, further comprising stored sequences of instructions, which when executed by the processor, cause the processor to perform:

confirming that the user has host privileges for the meeting.

14. The system of claim 9, wherein the mobile device accesses the meeting through a meeting application installed on the mobile device of the user.

15. The system of claim 9, wherein the meeting comprises a virtual meeting.

16. The system of claim 9, wherein a meeting room of the meeting comprises a virtual meeting room.

17. A non-transitory computer-readable storage medium comprising instructions stored thereon, which when executed by one or more processors, cause the one or more processors to perform operations for meeting room control, the operations comprising:

receiving, through a mobile device of a user, a request to access a meeting in at least one of a normal mode, a silent mode, or a control mode, the meeting comprising one or more virtual and/or non-virtual meetings;

receiving, from the mobile device of the user, a request to toggle the control mode for the meeting, the control mode comprising an interface for the meeting, the interface displayed through the mobile device, wherein toggling the control mode automatically mutes the user on the mobile device of the user;

receiving instructions regarding controlling functions of the meeting through the interface on the mobile device, the functions comprising at least one of muting all meeting participants, promoting a speaker, recording the meeting, sharing the meeting, or transferring the meeting; and applying the instructions to the functions of the meeting.

18. The computer-readable storage medium of claim 17, wherein the control mode comprises a reduced set of user controls.

* * * * *